US009429732B2

(12) United States Patent
Ahmed et al.

(10) Patent No.: US 9,429,732 B2
(45) Date of Patent: Aug. 30, 2016

(54) FIBER OPTIC CABLE CRIMP ASSEMBLIES EMPLOYING INTEGRALLY CONNECTED CABLE STRAIN RELIEF BOOTS, AND RELATED FIBER OPTIC CONNECTORS, CABLES, AND METHODS

(71) Applicant: Corning Cable Systems LLC, Hickory, NC (US)

(72) Inventors: Izhar Zahoor Ahmed, Painted Post, NY (US); Charles Todd Henke, Boyd, TX (US); Louis Edward Parkman, III, Richland Hills, TX (US); William Michael Schroeder, Fort Worth, TX (US); Nikhil Baburam Vasudeo, Painted Post, NY (US)

(73) Assignee: Corning Cable Systems LLC, Hickory, NC (US)

( * ) Notice: Subject to any disclaimer, the term of this patent is extended or adjusted under 35 U.S.C. 154(b) by 315 days.

(21) Appl. No.: 13/886,890

(22) Filed: May 3, 2013

(65) Prior Publication Data

US 2014/0328560 A1 Nov. 6, 2014

(51) Int. Cl.
  *G02B 6/36* (2006.01)
  *G02B 6/44* (2006.01)
  *G02B 6/38* (2006.01)

(52) U.S. Cl.
  CPC ......... *G02B 6/4471* (2013.01); *G02B 6/3887* (2013.01); *G02B 6/4477* (2013.01)

(58) Field of Classification Search
  None
  See application file for complete search history.

(56) References Cited

U.S. PATENT DOCUMENTS

| | | | |
|---|---|---|---|
| 4,795,229 A | 1/1989 | Abendschein et al. | |
| 5,390,272 A | 2/1995 | Repta et al. | |
| 5,418,876 A | 5/1995 | Lee | 385/80 |
| 5,475,782 A | 12/1995 | Ziebol | |
| 6,257,920 B1 | 7/2001 | Finona et al. | 439/455 |
| 6,374,022 B1 | 4/2002 | Parmigiani et al. | |
| 6,382,844 B1 | 5/2002 | Dubois et al. | |
| 6,517,254 B1 | 2/2003 | Hata et al. | 385/69 |
| 7,490,997 B2 | 2/2009 | Verhagen | |
| 7,742,667 B2 * | 6/2010 | Paschal et al. | 385/109 |
| 2004/0185705 A1 | 9/2004 | Wu | 439/459 |
| 2010/0322568 A1 | 12/2010 | Zimmel et al. | |
| 2011/0002586 A1 | 1/2011 | Nhep | |
| 2011/0091169 A1 | 4/2011 | Van Der Meulen et al. | 385/100 |

FOREIGN PATENT DOCUMENTS

| | | | |
|---|---|---|---|
| EP | 0602958 B1 | 3/1999 | |
| EP | 0996013 A2 | 4/2000 | G02B 6/40 |

OTHER PUBLICATIONS

Patent Cooperation Treaty International Search Report, Application No. PCT/US2014/036074, Aug. 7, 2014, 5 pages.

* cited by examiner

*Primary Examiner* — Tina Wong

(57) ABSTRACT

Embodiments disclosed herein include fiber optic cable crimp assemblies employing integrally connected cable strain relief boots to provide a single component crimp assembly. Related fiber optic connectors, cables, and methods are also disclosed. A fiber optic cable crimp assembly is employed for securing a fiber optic connector assembly to a fiber optic cable to form a terminated fiber optic connector. The fiber optic cable crimp assembly includes a cable strain relief boot configured to receive an end portion of a fiber optic cable to provide bend and strain relief for the end portion of the fiber optic cable. A fiber optic cable crimp band is integrally connected to the cable strain relief boot. The fiber optic crimp assembly is further configured to secure the end portion of the fiber optic cable to a fiber optic connector assembly.

15 Claims, 10 Drawing Sheets

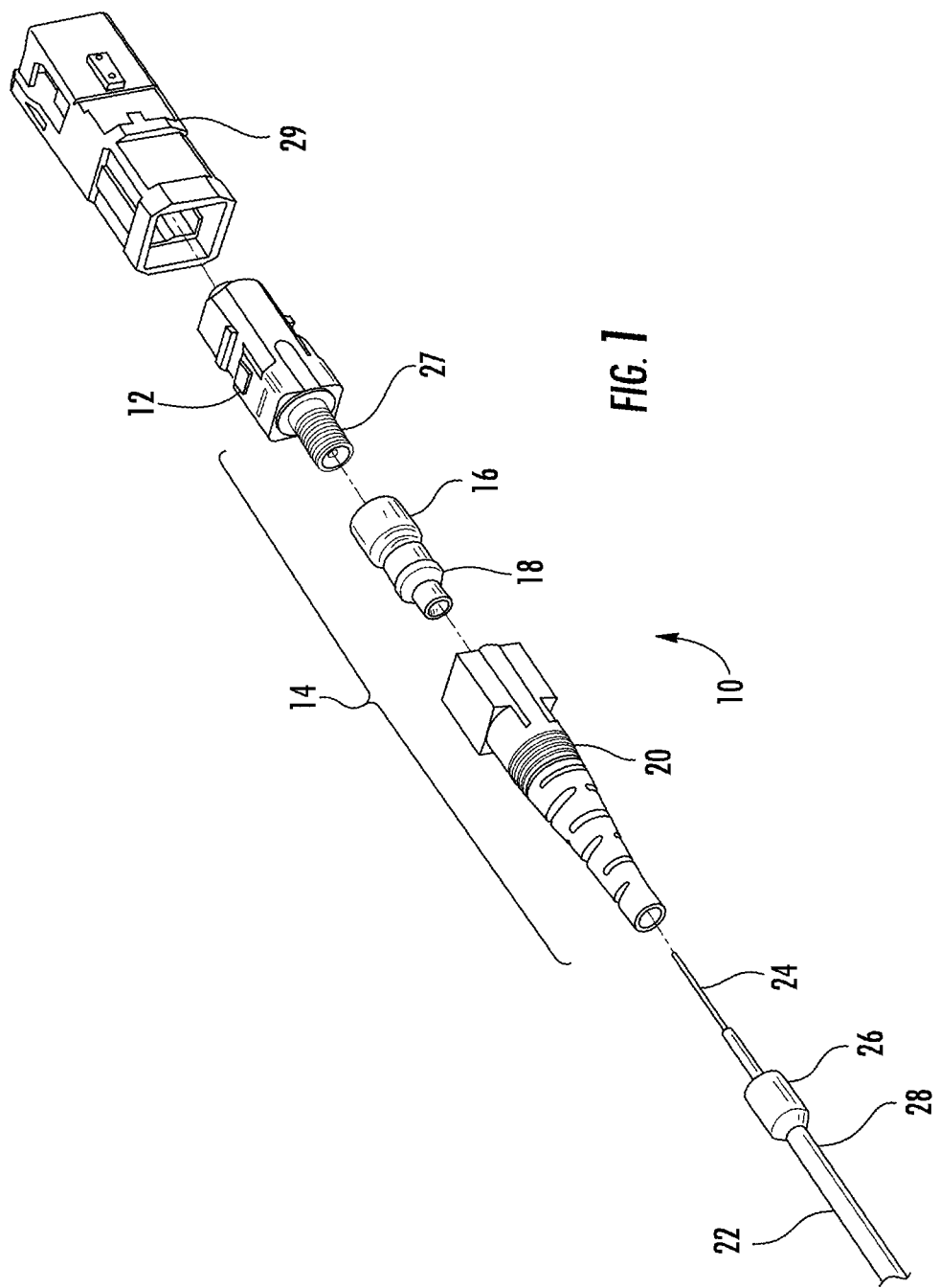

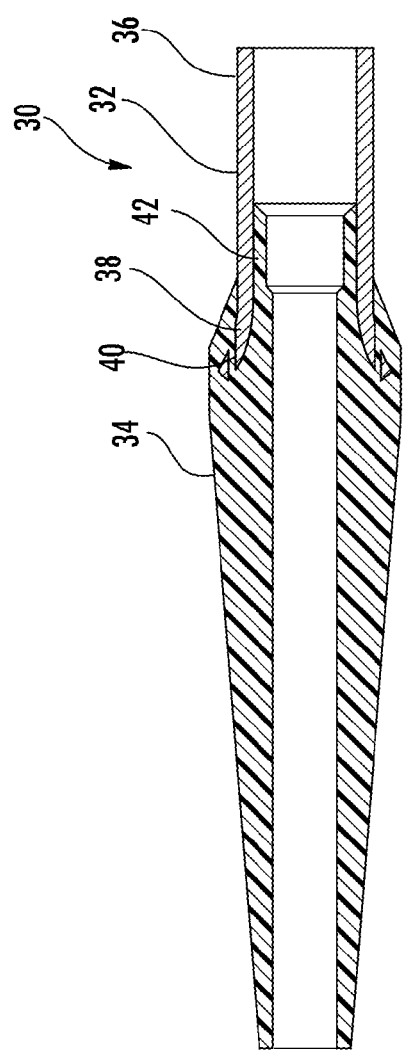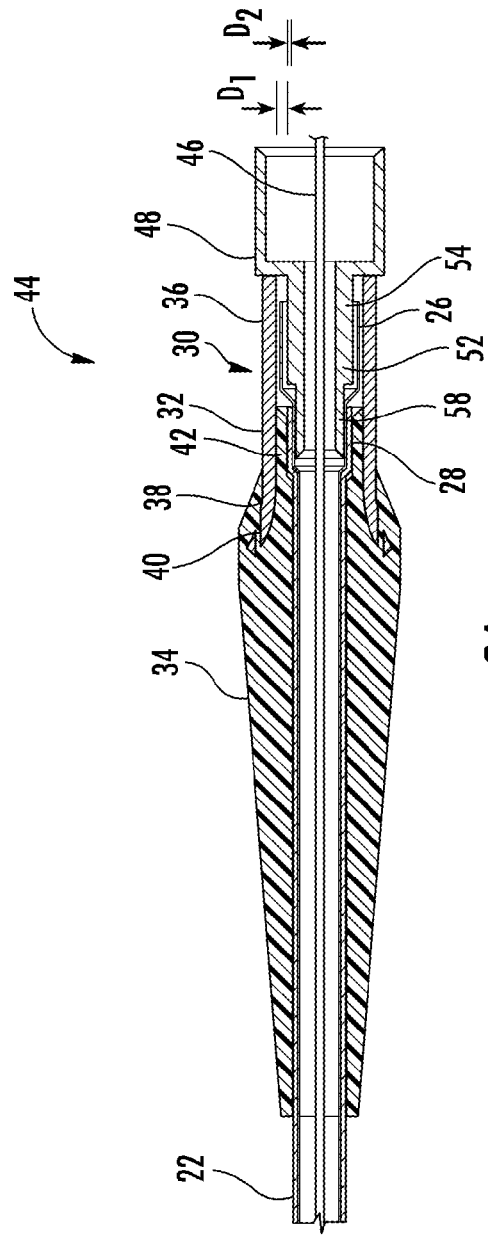

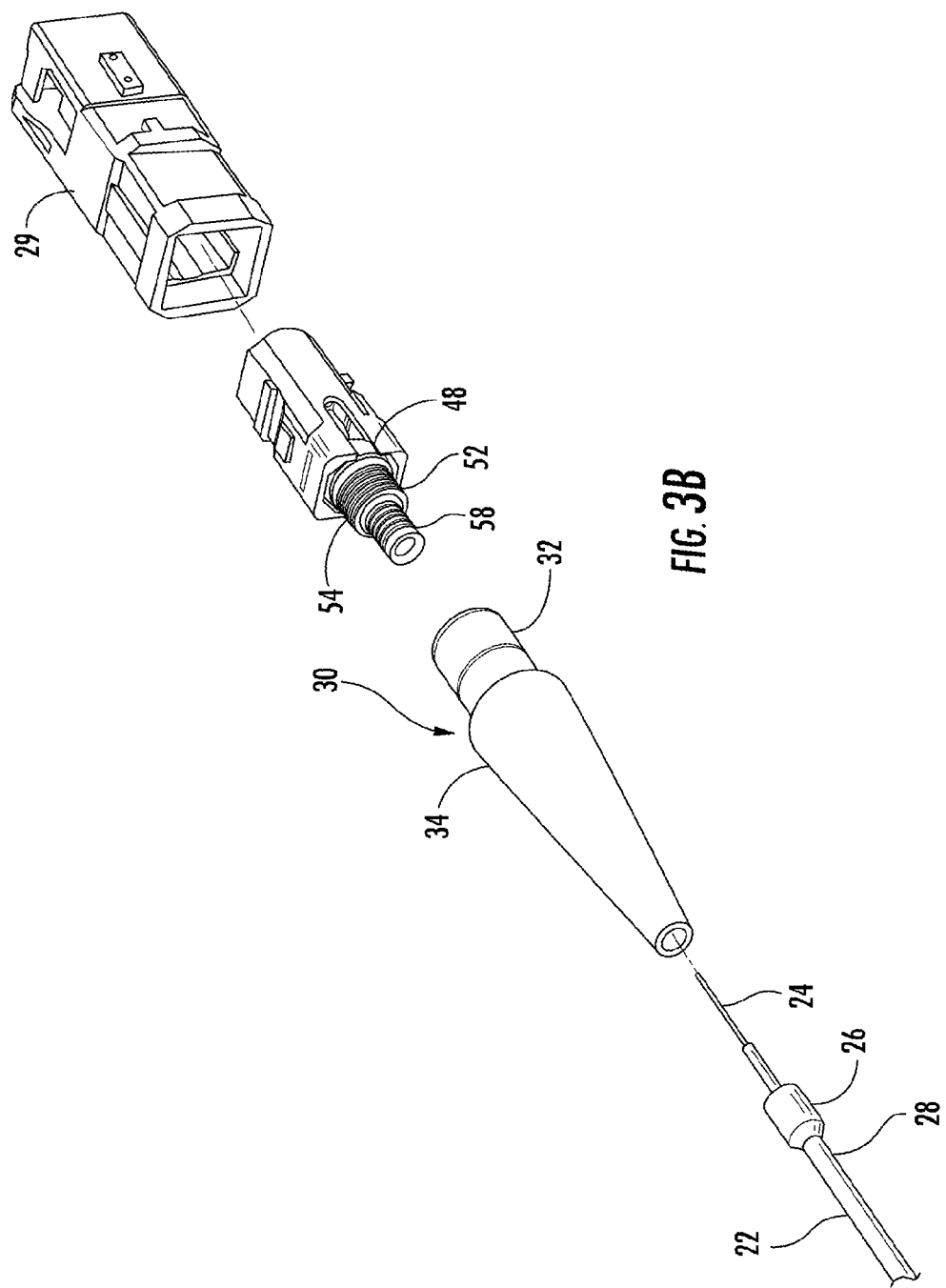

FIBER OPTIC CABLE CRIMP ASSEMBLIES EMPLOYING INTEGRALLY CONNECTED CABLE STRAIN RELIEF BOOTS, AND RELATED FIBER OPTIC CONNECTORS, CABLES, AND METHODS

BACKGROUND

The disclosure relates generally to fiber optic cable connectors, and more particularly, to fiber optic cable crimp assemblies employing integrally connected cable strain relief boots that may be used to secure an end portion of a fiber optic cable to a fiber optic connector assembly.

Benefits of utilizing optical fiber in data transmission and other applications include extremely wide bandwidth and low noise operation. Because of these advantages, optical fiber is increasingly being used for a variety of applications, including but not limited to broadband voice, video, and data transmissions in communications networks. As a result, communications networks include a number of optical interconnection points in fiber optic equipment and between fiber optic cables, to which optical fibers must be interconnected via fiber optic connections.

To conveniently provide these fiber optic connections, fiber optic connectors are provided. A fiber optic connector includes a housing that provides internal components for receiving, supporting, protecting, and aligning one or more end portions of optical fibers exposed from a fiber optic cable(s) when mated with other fiber optic connectors or adapters provided in fiber optic equipment or fiber optic cables. Fiber optic connectors may be installed on fiber optic cables in the field. Alternatively, fiber optic cables may be "pre-connectorized" during manufacturing of the fiber optic cables.

In this regard, a fiber optic connector typically employs a fiber optic connector sub-assembly in the form of a pre-assembled ferrule holder module. The connector sub-assembly contains a ferrule holder that holds a ferrule. A ferrule is a component that receives, supports, and positions one or more optical fibers in a known location with respect to a housing of a fiber optic connector. The ferrule holder has a passage extending therethrough that is axially aligned with a ferrule bore in the ferrule. Thus, when the housing of an assembled fiber optic connector is mated with another fiber optic connector or adapter, the optical fiber(s) disposed in the ferrule is positioned in a known, fixed location about the housing of the fiber optic connector. Thus, the optical fiber(s) is aligned with other optical fiber(s) provided in the mated fiber optic connector or adapter to establish an optical connection.

In this regard, FIG. 1 illustrates a fiber optic connector assembly 10 that includes a connector sub-assembly 12, a crimp sub-assembly 14 comprising a crimp band 16 and a heat shrink 18, and a cable strain relief boot 20. An end portion of a fiber optic cable 22 is inserted through the cable strain relief boot 20 and the crimp sub-assembly 14. An optical fiber 24 within the fiber optic cable 22 is inserted into the connector sub-assembly 12 and connected to a fiber optic ferule (not shown) within the connector sub-assembly 12. In this example, an end of one or more internal strength members 26, such as aramid yarn, of the fiber optic cable 22 is extracted and expanded from the end of the fiber optic cable 22 such that the strength members 26 can be disposed around a rear end 27 of the connector sub-assembly 12. The crimp band 16 is then crimped around the one or more strength members 26 of the fiber optic cable 22, thereby securing the one or more strength members 26 between the crimp band 16 and the rear end 27 of the connector sub-assembly 12. Next, in this example, heat is applied to the heat shrink 18 to shrink the heat shrink 18 around an end of an outer jacket 28, such as a protective jacket, to grip and retain the outer jacket 28 of the fiber optic cable 22. The cable strain relief boot 20 is then attached around the crimp sub-assembly 14 and/or the connector sub-assembly 12. In this embodiment, a shroud 29 may also be optionally attached around the connector sub-assembly 12 and the cable strain relief boot 20 to further secure the cable strain relief boot 20 to the connector sub-assembly 12.

Fiber optic connector assemblies may routinely be subjected to stresses, strains, and other forces in many common fiber optic cable applications, such as in a data center. As tension, stress, strain, or another force is applied to the fiber optic cable 22 or other component, that force can be transferred to other components of the fiber optic connector assembly 10, including the connector sub-assembly 12, the crimp band 16, the heat shrink 18, and/or the cable strain relief boot 20. When excessive force is applied to the fiber optic cable 22, one or more of these components may fail. For example, excessive force applied to one or more components of the fiber optic connector assembly 10 may cause the cable strain relief boot 20 to dislodge from the shroud 29, the connector sub-assembly 12, and/or the crimp sub-assembly 14. The applied force could also cause the outer jacket 28 to stretch the heat shrink 18 such that the heat shrink 18 may slip off the crimp band 16 and fail to secure the outer jacket 28. Accordingly, there is need for a durable fiber optic connector assembly 10 that can securely retain the various components of the fiber optic connector assembly 10 under a variety of real-world conditions.

No admission is made that any reference cited herein constitutes prior art. Applicant expressly reserves the right to challenge the accuracy and pertinency of any cited documents.

SUMMARY

Embodiments disclosed herein include fiber optic cable crimp assemblies employing integrally connected cable strain relief boots to provide a single component crimp assembly. Related fiber optic connectors, cables, and methods are also disclosed. A fiber optic cable crimp assembly is employed for securing a fiber optic connector assembly to a fiber optic cable to form a terminated fiber optic connector. The fiber optic cable crimp assembly includes a cable strain relief boot configured to receive an end portion of a fiber optic cable to provide bend and strain relief for the end portion of the fiber optic cable. A fiber optic cable crimp band is integrally connected to the cable strain relief boot, i.e., connected with the cable strain relief boot to form one piece. The fiber optic crimp assembly is further configured to secure the end portion of the fiber optic cable to a fiber optic connector assembly. In this manner, as a non-limiting example, by providing the fiber optic cable crimp assembly as an integral component employing an integrally connected cable strain relief boot, accidental detachment of the cable strain relief boot from the fiber optic connector is reduced or avoided over other assemblies that provide the strain relief boot and crimp assemblies as non-integrally connected components.

In this regard, in one embodiment, a fiber optic cable crimp assembly for securing a fiber optic cable to a fiber optic connector is provided. The fiber optic cable crimp assembly comprises a cable strain relief boot having a front end and a rear end. The cable strain relief boot is configured to receive an end portion of a fiber optic cable from the rear end of the cable strain relief boot and provide bend and strain relief for the end portion of the fiber optic cable. The fiber optic cable crimp assembly further comprises a fiber optic cable crimp band having a front end and a rear end. The rear end of the fiber optic cable crimp band is integrally connected to the front end of the cable strain relief boot. The fiber optic cable crimp band is configured to receive the end portion of the fiber optic cable extending through the cable strain relief boot. The fiber optic cable crimp band is further configured to secure the end portion of the fiber optic cable to a fiber optic connector assembly.

In another embodiment, a connectorized fiber optic cable assembly is provided. The connectorized fiber optic cable assembly comprises a fiber optic connector sub-assembly having a front end and a rear end. The connectorized fiber optic cable assembly also comprises a fiber optic cable crimp assembly. The fiber optic cable crimp assembly comprises a cable strain relief boot having a front end and a rear end. The fiber optic cable crimp assembly further comprises a fiber optic cable crimp band having a front end and a rear end. The rear end of the fiber optic cable crimp band is integrally connected to the front end of the cable strain relief boot. The connectorized fiber optic cable assembly further comprises a fiber optic cable having an end portion inserted through the rear end of the cable strain relief boot. The cable strain relief boot provides bend and strain relief for the end portion of the fiber optic cable. The fiber optic cable crimp band is crimped about the end portion of the fiber optic cable and about the fiber optic connector sub-assembly such that the end portion of the fiber optic cable is secured to the fiber optic connector sub-assembly.

In another embodiment, a method of assembling a terminated fiber optic connector assembly is provided. The method comprises providing a fiber optic connector sub-assembly having a front end and a rear end. The method further comprises providing a fiber optic cable crimp assembly. The fiber optic cable crimp assembly comprises a cable strain relief boot having a front end and a rear end. The fiber optic cable crimp assembly further comprises a fiber optic cable crimp band having a front end and a rear end. The rear end of the fiber optic cable crimp band is integrally connected to the front end of the cable strain relief boot. The method further comprises inserting an end portion of a fiber optic cable through the rear end of the cable strain relief boot such that the cable strain relief boot provides bend and strain relief for the end portion of the fiber optic cable. The method further comprises crimping the fiber optic cable crimp band about the end portion of the fiber optic cable and the fiber optic connector sub-assembly such that the end portion of the fiber optic cable is secured to the fiber optic connector sub-assembly.

In another embodiment, a method of forming a fiber optic cable crimp assembly is provided. The method comprises disposing a rear end of a fiber optic cable crimp band in a mold defining a cavity for forming a cable strain relief boot. The method further comprises disposing a mold pin through the fiber optic cable crimp band such that the mold pin forms a seal separating the rear end from a front end of the fiber optic cable crimp band. The method further comprises disposing a moldable material in the mold such that the moldable material flows around the mold pin and the rear end of the fiber optic cable crimp band. The method thereby forms a cable strain relief boot for providing bend and strain relief for an end portion of a fiber optic cable. The cable strain relief boot has an integral connection between the cable strain relief boot and the rear end of the fiber optic cable crimp band.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 1 is an exploded isometric view of an exemplary fiber optic connector assembly having a crimp sub-assembly comprising a crimp band and a heat shrink;

FIG. 2 is a cross-sectional side view of an exemplary fiber optic cable crimp assembly having a crimp band and an integrally connected cable strain relief boot for securing a fiber optic cable to a fiber optic connector assembly;

FIG. 3A is a cross-sectional side view of an exemplary assembled fiber optic connector assembly that includes the fiber optic cable crimp assembly of FIG. 2;

FIG. 3B is an exploded isometric view of the fiber optic connector assembly of FIG. 3A.

DETAILED DESCRIPTION

Figure 4A:
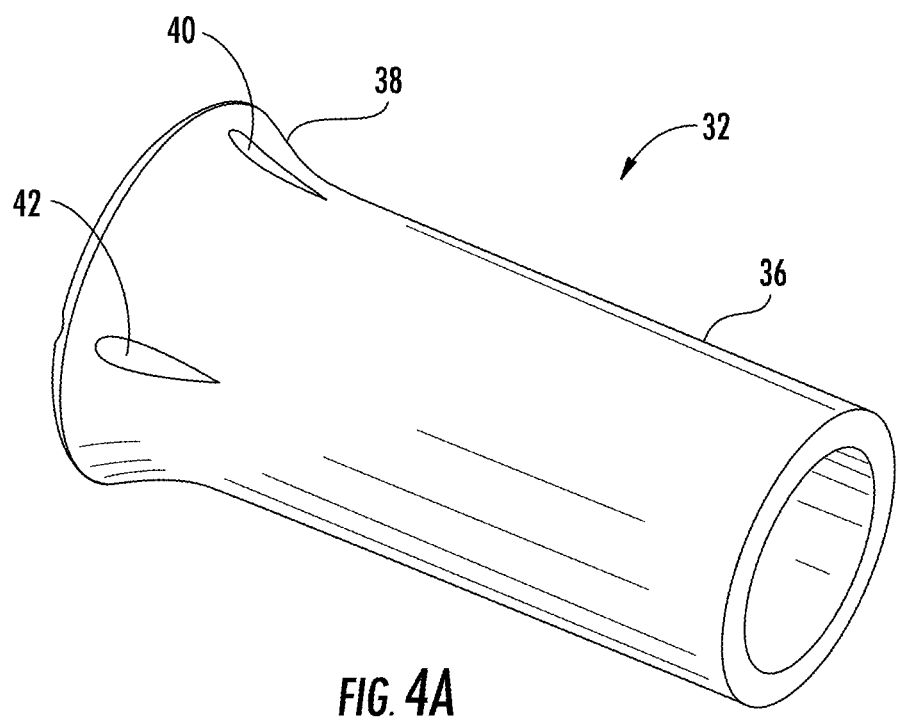
FIG. 4A is an isometric view of an exemplary crimp band used as part of the fiber optic cable crimp assembly according to the embodiment of FIGS. 3A-3B.

Embodiments disclosed herein include fiber optic cable crimp assemblies employing integrally connected cable strain relief boots to provide a single component crimp assembly. Related fiber optic connectors, cables, and methods are also disclosed. A fiber optic cable crimp assembly is employed for securing a fiber optic connector assembly to a fiber optic cable to form a terminated fiber optic cable assembly. The fiber optic cable crimp assembly includes a cable strain relief boot configured to receive an end portion of a fiber optic cable to provide bend and strain relief for the end portion of the fiber optic cable. A fiber optic cable crimp band is integrally connected to the cable strain relief boot, i.e., connected with the cable strain relief boot to form one piece. The fiber optic crimp assembly is further configured to secure the end portion of the fiber optic cable to a fiber optic connector assembly. In this manner, as a non-limiting example, by providing the fiber optic cable crimp assembly as an integral component employing an integrally connected cable strain relief boot, accidental detachment of the cable strain relief boot from the fiber optic connector is reduced or avoided over other assemblies that provide the strain relief boot and crimp assemblies as non-integrally connected components.

Various embodiments will be further clarified by the following examples. In this regard, FIG. 2 illustrates an exemplary fiber optic cable crimp assembly 30. The fiber optic cable crimp assembly 30 has a crimp band 32 integrally connected to a cable strain relief boot 34. In this embodiment, the crimp band 32 includes a substantially cylindrical front end 36 and a radially flared rear end 38. The flared rear end 38 in this embodiment has a number of functions. For example, an outer surface (not shown) of the flared rear end 38 helps retain the cable strain relief boot 34 in place. An inner surface of the flared rear end 38 may also provide a structural bend radius to avoid excessive bending of a fiber optic cable, such as fiber optic cable 22 of FIG. 1, at points near the front end 36 of the crimp band 32. In some embodiments, the flared rear end 38 can be formed by deep drawing, punching, machining, or another process, or a combination thereof.

In the fiber optic cable crimp assembly 30 of FIG. 2, the cable strain relief boot 34 is overmolded over the flared rear end 38 of the crimp band 32, and through a plurality of through holes 40, thereby integrally and mechanically connecting the cable strain relief boot 34 to the crimp band 32. In this regard, during the molding process, described in greater detail with respect to FIGS. 12A and 12B, a moldable material, such as flexible thermoplastic, fluid or semifluid material, curable material or other material, is disposed around the flared rear end 38 of the crimp band 32. The moldable material also flows through and fills the through holes 40 such that, when the moldable material forms the cable strain relief boot 34, the portions of the moldable material occupying the through holes 40 are permanently held in place by the flared rear end 38 of the crimp band 32. In this embodiment, the cable strain relief boot 34 cannot be removed from the crimp band 32 without damaging the cable strain relief boot 34, the crimp band 32, or both.

In this embodiment, the cable strain relief boot 34 includes an integrally formed gasket portion 42 that extends through the flared rear end 38 of the crimp band 32 and partially extends along an inner surface of the front end 36 of the crimp band 32. As will be explained in greater detail with respect to FIG. 3, the gasket portion 42 may cooperate with components of a fiber optic cable that is inserted through the fiber optic cable crimp assembly 30 to connectorize the fiber optic cable 22. In this manner, by employing an integrally connected cable strain relief boot 34, the fiber optic cable crimp assembly 30 can be provided as a single component prior to assembly of a fiber optic connector.

In this regard, FIG. 3A illustrates a cross-sectional side view of a fiber optic connector assembly 44 that includes, as a sub-assembly, the fiber optic cable crimp assembly 30 of FIG. 2. A fiber optic cable 22 is first inserted through the cable strain relief boot 34. Next, an end of an optical fiber 24 is inserted into a connector sub-assembly 48, where it may be optically connected with a fiber optic ferule (not shown). Next, an end of one or more strength members 26, such as an aramid yarn, of the fiber optic cable 22 is disposed around a stepped portion 52 of a crimp body 54, located on a rear end of the connector sub-assembly 48. The one or more strength members 26 and an end of an outer jacket 28, such as a protective plastic jacket, of the fiber optic cable 22 are then disposed around an end portion 58 of the crimp body 54. Thus, when the fiber optic cable crimp assembly 30 is fitted around the crimp body 54, the end of the one or more strength members 26 is disposed between an outer surface of the stepped portion 52 of the crimp body 54, and an inner surface of the crimp band 32, while the end of the outer jacket 28 is disposed between an outer surface of the end portion 58 of the crimp body 54 and an inner surface of the gasket portion 42.

When the crimp band 32 is crimped, i.e., compressed and deformed around the crimp body 54 to pinch the one or more strength members 26 and outer jacket 28, the one or more strength members 26 is held tightly in place between two rigid surfaces of the crimp band 32 and the crimp body 54. However, the outer jacket 28 is typically formed from a thicker material, such as thermoplastic, than the one or more strength members 26, and therefore may be significantly less durable under compression than the one or more strength members 26, which may be formed of a thinner material, such as aramid yarn. To protect the outer jacket 28 from being over-compressed, the outer jacket 28 is compressed between a rigid outer surface of the end portion 58 of the crimp body 54 and the flexible inner surface of the gasket portion 42. Regardless, a sufficient amount of force is applied to both the outer jacket 28 and the one or more strength members 26 to securely retain both elements against the crimp body 54, while protecting the outer jacket 28 from being over-compressed and damaged.

Another feature of this embodiment is that the wall thickness $D_1$ of the gasket portion 42 can be significantly larger than the material thickness $D_2$ of the outer jacket 28. Thus, the gasket portion 42 is able to absorb a significant amount of stress when the crimp band 32 is crimped to the crimp body 54, and while applying sufficient force to the outer jacket 28 to retain the outer jacket 28 between the gasket portion 42 and the end portion 58 of the crimp body 54. In turn, this arrangement allows the entire front end 36 of the crimp band 32 to be uniformly crimped around the crimp body 54 with a consistent amount of force and in a single action, such as with a crimp tool (not shown).

Any of the fiber optic cable crimp assemblies disclosed herein may be used as a sub-assembly within a connector assembly, such as the fiber optic connector assembly 44 of FIG. 3A. In this regard, FIG. 3B is an exploded isometric view of the fiber optic connector assembly 44 of FIG. 3A. The fiber optic connector assembly 44 includes a connector sub-assembly 48, and a fiber optic cable crimp assembly 30, as mentioned above. An end of a fiber optic cable 22 is inserted through fiber optic cable crimp assembly 30, and the optical fiber 24 within the fiber optic cable 22 is inserted into the connector sub-assembly 48 and connected to a fiber optic ferule (not shown) within the connector sub-assembly 48. In this example, an end of the one or more strength members 26, such as aramid yarn, of the fiber optic cable 22 is extracted and expanded from the end of the fiber optic cable 22 such that the one or more strength members 26 can be disposed around the stepped portion 52 of crimp body 54 of the connector sub-assembly 48. An end of the outer jacket 28 of the fiber optic cable 22 is next disposed around the end portion 58 of crimp body 54 of the connector sub-assembly 48. The front end 36 of crimp band 16 of fiber optic cable crimp is then crimped around crimp body 54. This also secures the one or more strength members 26 between the crimp band 16 and the stepped portion 52 of the crimp body 54 and securing the outer jacket 28 between the gasket portion 42 (not shown) and end portion 58 of crimp body 54. In this embodiment, the shroud 29 for an SC connector may also be optionally attached around the connector sub-assembly 48 and/or the fiber optic cable crimp assembly 30, to further secure the fiber optic cable crimp assembly 30 to the connector sub-assembly 12. It should be understood that the above embodiments may be modified to be used with, without limitation, LC, ST, FC, MU or other connector types.

As a result of the one or more internal strength members 26 and outer jacket 28 being held in place by the crimping actions described above, the optical fiber 24 of the fiber optic cable 22 is retained in the connector sub-assembly 48. Additionally, the fiber optic cable 22 is remains free to bend relative to the connector sub-assembly 48 within the cable strain relief boot 34. The cable strain relief boot 34 may include a tapered profile, as shown in FIGS. 2 and 3A-3B, or other type of profile to allow a sufficient bend radius along the fiber optic cable 22 with a variety of loads applied.

Figure 4B:
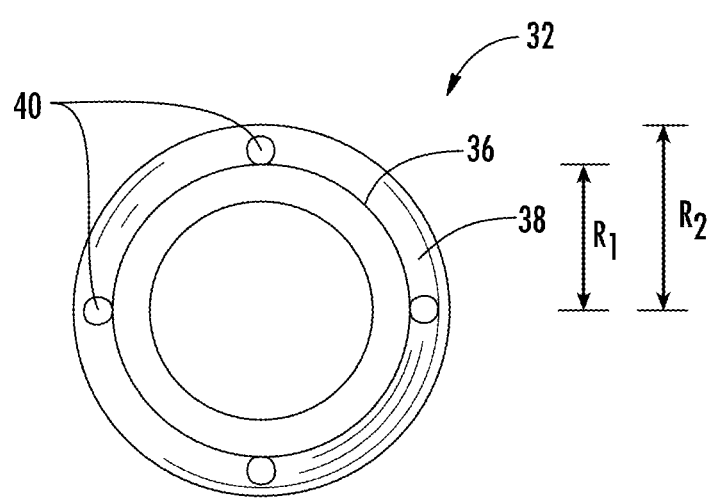
FIG. 4B is a front view of the crimp band according to the embodiment of FIG. 4A.

As can be appreciated, the above described fiber optic cable crimp assembly 30 offers a durable and secure one-piece component for securing a fiber optic cable 22 as part of a fiber optic connector assembly 44 by integrally and mechanically connecting the crimp band 32 and the cable strain relief boot 34. The connection may be achieved in a number of different ways. For example, the shape and configuration of the crimp band 32 may be varied in different embodiments. FIGS. 4A and 4B illustrate respective isometric and front views of the crimp band 32 prior to overmolding the cable strain relief boot 34 over the crimp band 32. In this embodiment, the crimp band 32 has four through holes 40(1)-40(4) equally spaced around the rear end 38 of the crimp band 32, but it should be understood that any number of through holes 40 may be employed. FIG. 4B also illustrates that a radius $R_1$ of the front end 36 of crimp band 32 may be smaller than a radius $R_2$ of the flared rear end 38 of the crimp band 32, for example to facilitate a larger bend radius for an optical fiber disposed therethrough.

Figure 5A:
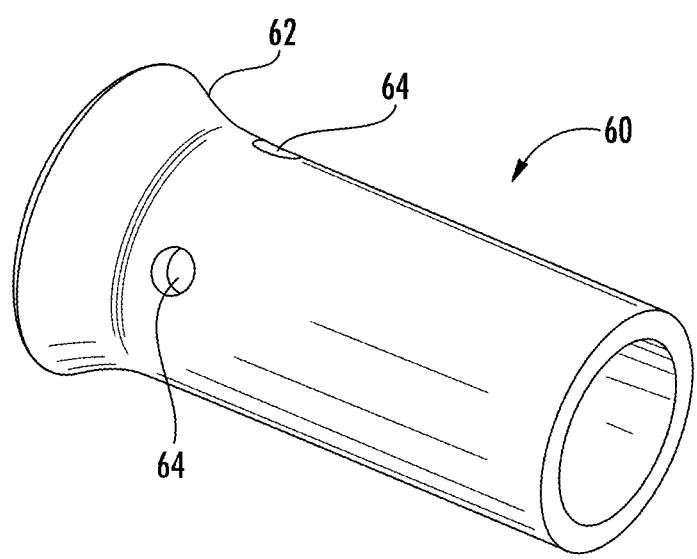
FIG. 5A is an isometric view of an exemplary crimp band having a non-flared rear end, used as part of a fiber optic cable crimp assembly according to another embodiment.
Figure 5B:
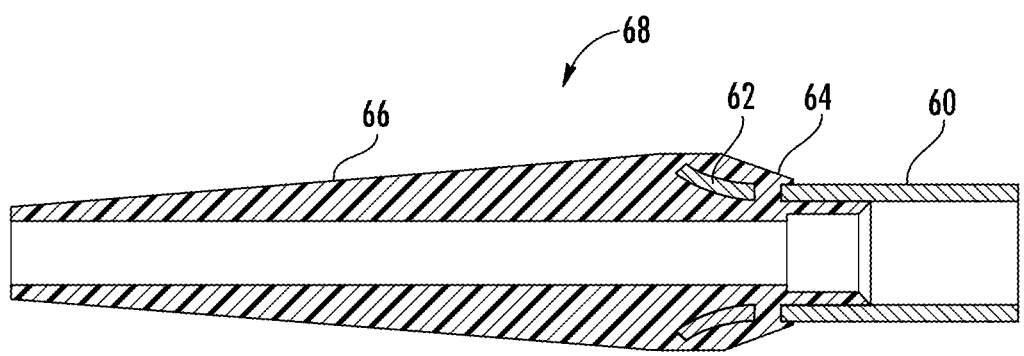
FIG. 5B is a cross-sectional side view of an exemplary fiber optic cable crimp assembly that includes the crimp band according to the embodiment of FIG. 5A.

In the embodiment of FIGS. 2-4B, each through hole 40 extends through the rear end 38 of the crimp band 32 in a direction parallel to a longitudinal axis of the crimp band 32. It should be understood, however, that the through holes 40 may extend in any direction. For example, FIG. 5A illustrates a crimp band 60 having a flared rear end 62, similar to the flared rear end 38 of the crimp band 32 of FIGS. 2-4B. The flared rear end 62 includes a plurality of through holes 64 that each extend through the rear end 62 of the crimp band 60 in a direction normal to a longitudinal axis of the crimp band 60. As shown by FIG. 5B, a modified cable strain relief boot 66 can be overmolded over the rear end 62 of the crimp band 60 in a similar manner to the fiber optic cable crimp assembly 30 of FIGS. 2-4B to integrally and mechanically connect the cable strain relief boot 66 to the crimp band 60.

Figure 6A:
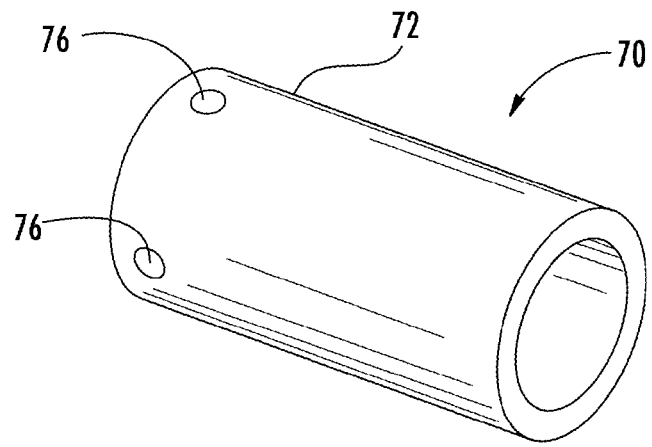
FIG. 6A is an isometric view of an exemplary crimp band having through holes perpendicular to a longitudinal axis of the crimp band to form an integrally connected fiber optic cable crimp assembly according to another embodiment.
Figure 6B:
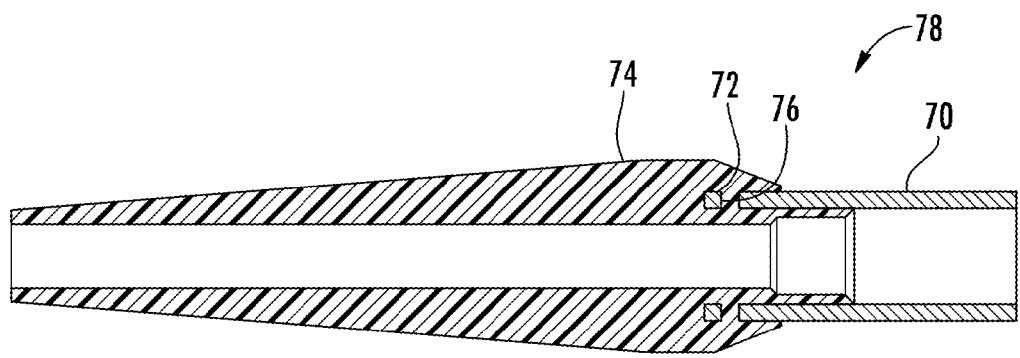
FIG. 6B is a cross-sectional side view of an exemplary fiber optic cable crimp assembly that includes the crimp band according to the embodiment of FIG. 6A.

The shape of the crimp bands 32, 60 shown in the embodiments of FIGS. 2 and 5A-5B may also vary. In this regard, FIG. 6A illustrates a simplified crimp band 70 that includes a straight rear end 72 that is not flared. One advantage of the simplified embodiment of FIG. 6A is that the cost to manufacture the simplified crimp band 70 may be less than more advanced designs, such as the crimp band 32 of FIGS. 2-4B or the crimp band 60 of FIGS. 5A and 5B. The reduced costs may be because it is not necessary to flare or otherwise deform the rear end 62 of the crimp band 60 in this embodiment. As shown in FIG. 6B, a modified cable strain relief boot 74 may be overmolded over the rear end 72 of the crimp band 70 in a similar manner to the above described embodiments to integrally and mechanically connect to the crimp band 70 via a plurality of through holes 76, thereby forming another type of one-piece fiber optic cable crimp assembly 78. In another embodiment, the crimp band 60 of the embodiment of FIGS. 6A and 6B and other embodiments can omit the through holes 76 as well. In this manner, the crimp band 60 may integrally retain the modified cable strain relief boot 74 by adhesion, friction or other forces that do not require a mechanical connection between the crimp band 60 and the cable strain relief boot 74.

Figure 7A:
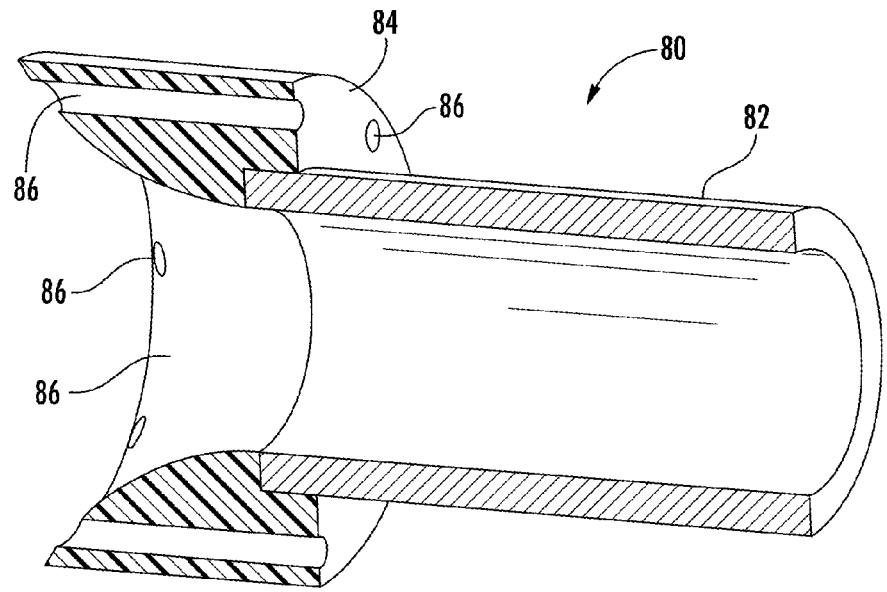
FIG. 7A is an isometric cross-sectional view of an exemplary crimp band having a non-integrally formed connection section to form an integrally connected fiber optic cable crimp assembly according to another embodiment.
Figure 7B:
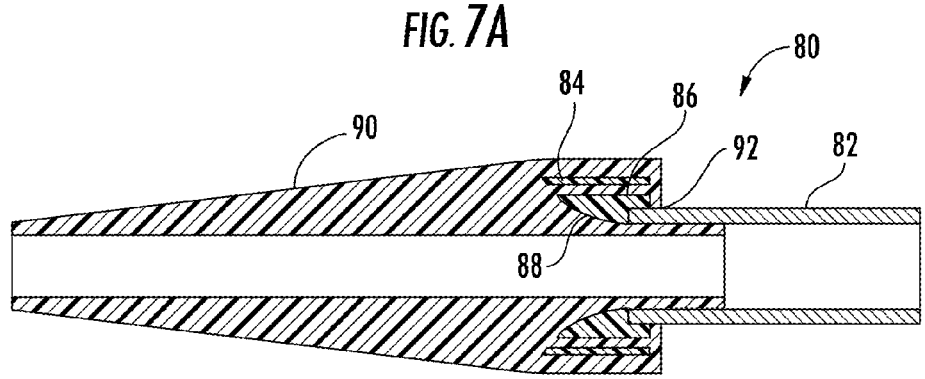
FIG. 7B is a cross-sectional side view of an exemplary fiber optic cable crimp assembly that includes the crimp band according to the embodiment of FIG. 7A.

FIG. 7A illustrates a fiber optic cable crimp assembly 80 according to another embodiment that combines some of the features and benefits of the previously-discussed embodiments. The fiber optic cable crimp assembly 80 includes a straight, simple crimp band 82 attached to a separate connection section 84. In this embodiment, the crimp band 82 itself does not require flaring or through holes (such as the through holes 40, 64, and 76 of FIGS. 2, 5A-5B, and 6A-6B). Instead, the crimp band 82 is permanently connected to the connection section 84, which may include a plurality of through holes 86 and a flared inner surface 88. As shown in FIG. 7B, a cable strain relief boot 90 is molded over the entire connection section 84 and a rear end 92 of the crimp band 82 to encapsulate or otherwise surround the rear end 92 of the crimp band 82, thereby forming an integral and mechanical connection. It should be noted that, similar to the examples described in FIGS. 2-6B above, the crimp band 82 and/or the connection section 84 may have any profile and/or configuration of through holes 86 (or other recesses or protrusions) for integrally and mechanically connecting to the cable strain relief boot 90. Additionally, in some embodiments the cable strain relief boot 90 may be molded over only a portion of the connection section 84 or completely over the connection section 84 but not the rear end 92 of the crimp band 82. Regardless, the various ways of connecting the cable strain relief boot to the rear end of the crimp band described above in connection with FIGS. 2-6B may equally apply to the connecting portion 84.

One advantage of the fiber optic cable crimp assembly 80 of FIGS. 7A and 7B is that an inexpensive, generic crimp band 82 that contains no flaring or through holes may be used. The connection section 84 may be formed separately and attached to the crimp band 82 by any number of methods, including overmolding, adhesive, welding, or other known attachment methods. The connection section 84 may also be formed from a different material than the crimp band 82, such as rigid thermoplastic, that may further reduce the component and assembly costs for the fiber optic cable crimp assembly 80.

Figure 8:
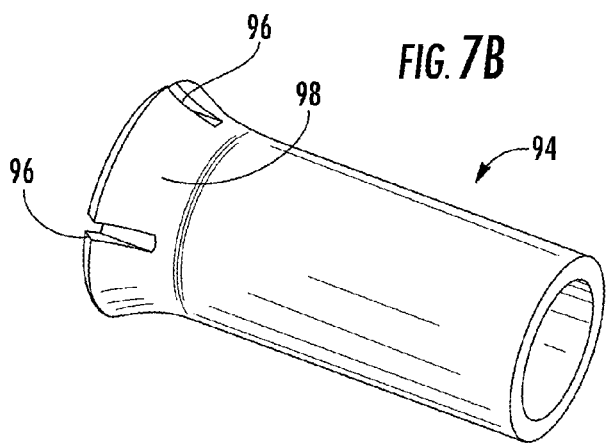
FIG. 8 is an isometric view of an exemplary crimp band having longitudinal grooves formed in a flared rear end to form an integrally connected fiber optic cable crimp assembly according to another embodiment.

It may also be desired to simplify production and reduce costs in other ways. In this regard, FIG. 8 illustrates an exemplary crimp band 94 having a plurality of grooves 96 arranged radially around a flared rear end 98 of the crimp band 94. The grooves may be in lieu of through holes and allow for less complex molding operations. In another embodiment, these grooves 96 may be included in addition to through holes similar to the through holes 40, 64, 76, 86 of FIGS. 2-7B. A cable strain relief boot (not shown), similar to the cable strain relief boots 34, 66, 74, of FIGS. 2-6B, may then be similarly formed around the crimp band 94 of FIG. 8, with the grooves 96 engaging material of a cable strain relief boot to integrally and mechanically connect the cable strain relief boot to the crimp band 94.

Figure 9A:
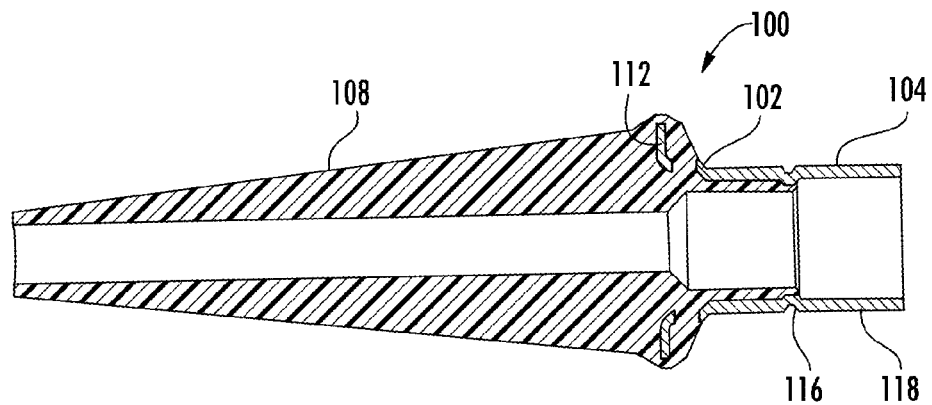
FIG. 9A is a cross-sectional side view of an exemplary fiber optic cable crimp assembly having portions of a rear end of a crimp band exposed via orifices in a cable strain relief boot, to form an integrally connected fiber optic cable crimp assembly according to another embodiment.
Figure 9B:
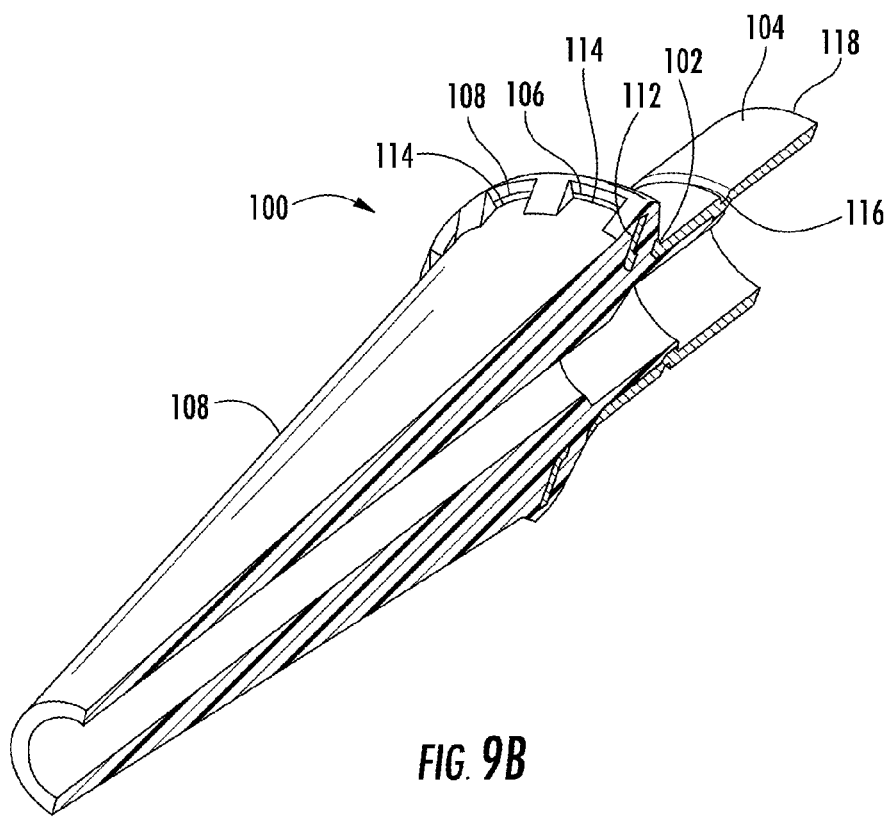
FIG. 9B is an isometric cross-sectional view of the fiber optic cable crimp assembly according to the embodiment of FIG. 9A.

In the foregoing embodiments of FIGS. 2-8, the entire rear end of each crimp band is covered by the front end of the respective cable strain relief boot. In alternative embodiments, this may not be the case. For example, FIGS. 9A and 9B illustrate an alternative fiber optic cable crimp assembly 100 where one or more portions of a rear end 102 of a crimp band 104 may be exposed via at least one orifice 106 in a cable strain relief boot 108. More specifically, the rear end 102 of the crimp band 104 includes one or more flared flanges 112 that bend outward radially such that an edge 114 of each flange 112 is exposed through the orifices 106 of the cable strain relief boot 108. One advantage of this arrangement is that the exposed edges 114 of the flanges 112 provide rigid engagement points for securely holding the fiber optic cable crimp assembly 100 in place, such as by a specialized tool or machine. A circular groove 116 in a front end 118 of the crimp band 104 may provide an additional engagement point for securely holding the fiber optic cable crimp assembly 100. The secure hold may allow the fiber optic cable crimp assembly 100 to be more easily manipulated in an automated or semi-automated process, such as the initial overmolding of the cable strain relief boot 108 onto the crimp band 104.

Figure 10:
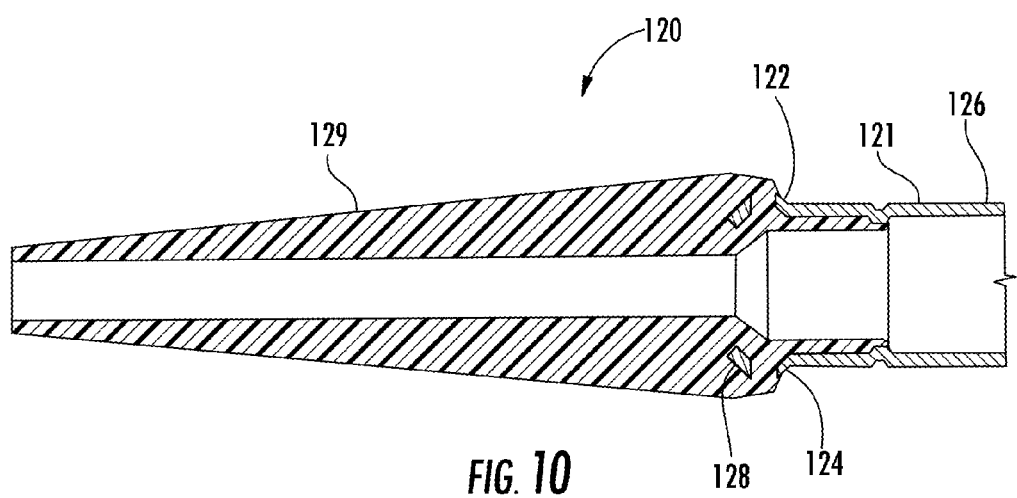
FIG. 10 is a cross-sectional side view of an exemplary fiber optic cable crimp assembly that has a flared portion and a narrowed section at a rear end of a crimp band, to form an integrally connected fiber optic cable crimp assembly according to another embodiment.
Figure 11:
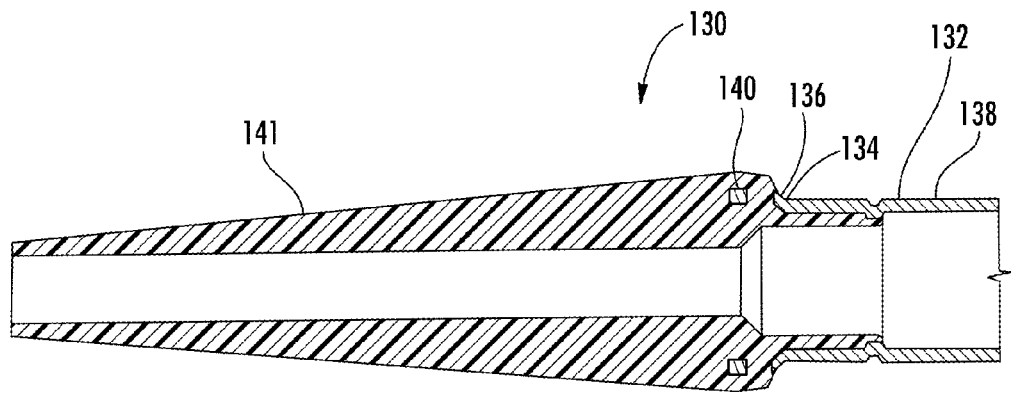
FIG. 11 is a cross-sectional side view of an exemplary fiber optic cable crimp assembly that has a flared portion and a parallel section at a rear end of a crimp band, to form an integrally connected fiber optic cable crimp assembly according to another embodiment.

Other fiber optic cable crimp assemblies employing flanges are now discussed. FIG. 10 illustrates an alternative embodiment of a fiber optic cable crimp assembly 120 having a crimp band 121 with a flanged rear end 122 with a flared portion 124 that initially flares out from a front end 126 of the crimp band 121. The flanged rear end 122 also has an inward extending portion 128 that constricts back toward a longitudinal axis of the crimp band 121. Such an arrangement may permit a reduced outer diameter for the cable strain relief boot 129 and the fiber optic cable crimp assembly 120 while retaining some of the advantages of the embodiments described above with respect to FIGS. 2-5B and 7A-9B. In another alternative embodiment illustrated by FIG. 11, a fiber optic cable crimp assembly 130 includes a crimp band 132 having a flanged rear end 134 with a flared portion 136 that initially flares out from a front end 138 of the crimp band 132, and a straight portion 140 that extends parallel to the longitudinal axis of the crimp band 132 and cable strain relief boot 141. This arrangement may also permit a reduced outer diameter for the cable strain relief boot 141.

Figure 12A:
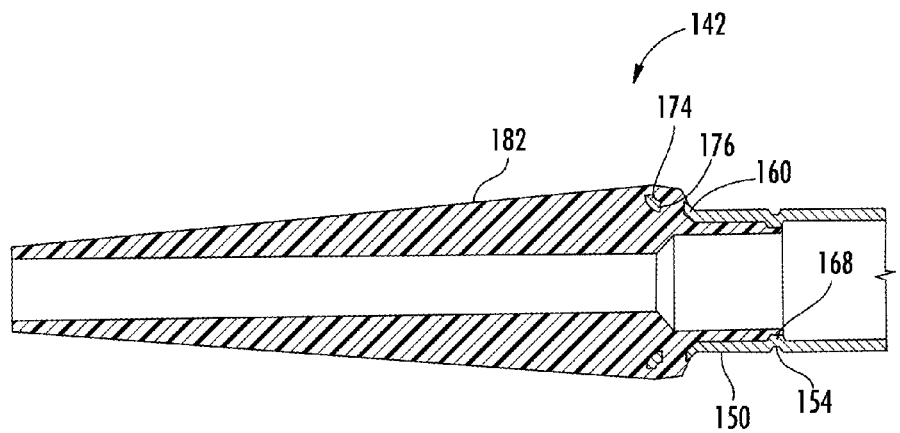
FIG. 12A is a cross-sectional side view of an exemplary fiber optic cable crimp assembly that has a flared portion having a shortened flange at a rear end of a crimp band, to form an integrally connected fiber optic cable crimp assembly according to another embodiment.
Figure 12B:
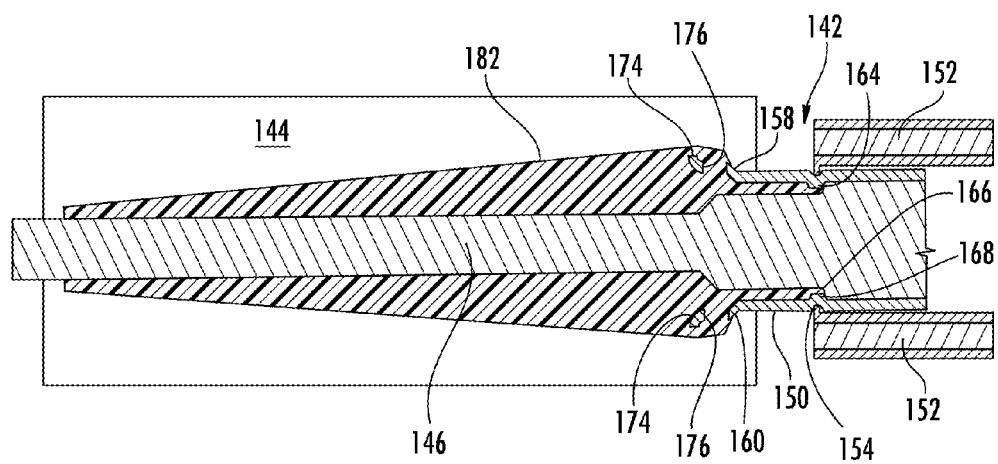
FIG. 12B is a cross-sectional side view illustrating an exemplary step in an exemplary process for assembling the fiber optic cable crimp assembly of FIG. 12A by overmolding.

A method of making an exemplary fiber optic cable crimp assembly will now be described in further detail with reference to FIGS. 12A and 12B. To this end, FIG. 12A illustrates a fiber optic cable crimp assembly 142 according to an alternative embodiment, and FIG. 12B illustrates the fiber optic cable crimp assembly 142 disposed in a mold 144 with a mold pin 146 extending therethrough. As can be seen in FIG. 12B, a crimp band 150 is secured and suspended by clamp members 152, which mate with a circular groove 154 of the crimp band 150 in this embodiment. The mold 144 forms an outer seal 158 around a rear end 160 of the crimp band 150 (block 162). The mold pin 146 includes a radial step 164 that forms an inner seal 166 around an annular boss 168 corresponding to the circular groove 154. Moldable material can then be disposed in the mold 144, for example through injection molding, to flow around the rear end 160 of the crimp band 150, including flanges 174 and through holes 176, thereby forming a cable strain relief boot 182 integrally connected to the crimp band 150. The fully assembled integrated fiber optic cable crimp assembly 142 is then removed from the mold. The integrated fiber optic cable crimp assembly 142 can then be removed from the mold 144. Similar techniques may be used to make fiber optic cable crimp assemblies according to other embodiments discussed above.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:
1. A connectorized fiber optic cable assembly, comprising:
   a fiber optic connector sub-assembly having a front end and a rear end;
   a fiber optic cable crimp assembly comprising:
      a cable strain relief boot having a front end and a rear end; and
      a fiber optic cable crimp band having a front end and a rear end, the rear end of the fiber optic cable crimp band integrally connected to the front end of the cable strain relief boot; and a fiber optic cable having an end portion inserted through the rear end of the cable strain relief boot, wherein:
- the cable strain relief boot provides bend and strain relief for the end portion of the fiber optic cable;
- the fiber optic cable crimp band is crimped about the end portion of the fiber optic cable and about the fiber optic connector sub-assembly such that the end portion of the fiber optic cable is secured to the fiber optic connector sub-assembly;
- the cable strain relief boot includes an integral gasket portion extending into the rear end of the fiber optic cable crimp band along an interior surface of the fiber optic cable crimp band; and
- the gasket portion is compressed around an outer jacket of the fiber optic cable for securing the fiber optic cable to the fiber optic connector sub-assembly.

2. The connectorized fiber optic cable assembly of claim 1, wherein the rear end of the fiber optic cable crimp band is mechanically connected to the front end of the cable strain relief boot.

3. The connectorized fiber optic cable assembly of claim 1, wherein the front end of the cable strain relief boot is overmolded over at least a portion of the rear end of the fiber optic cable crimp band.

4. The connectorized fiber optic cable assembly of claim 3, wherein the rear end of the fiber optic cable crimp band is covered entirely by the front end of the cable strain relief boot.

5. The connectorized fiber optic cable assembly of claim 3, wherein at least a second portion of the rear end of the fiber optic cable crimp band is exposed via at least one orifice in the cable strain relief boot.

6. The connectorized fiber optic cable assembly of claim 1, wherein the front end of the cable strain relief boot is integrally connected to the fiber optic cable crimp band by interfacing with at least one recess in the fiber optic cable crimp band.

7. The connectorized fiber optic cable assembly of claim 6, wherein the at least one recess in the fiber optic cable crimp band comprises at least one throughhole, thereby forming an integral mechanical connection between the fiber optic cable crimp band and the cable strain relief boot.

8. The connectorized fiber optic cable assembly of claim 6, wherein the at least one recess in the fiber optic cable crimp band comprises at least one groove.

9. The connectorized fiber optic cable assembly of claim 1, wherein the rear end of the fiber optic cable crimp band is flared with respect to the front end of the fiber optic cable crimp band.

10. The connectorized fiber optic cable assembly of claim 9, wherein a radius of the flared rear end of the fiber optic cable crimp band is larger than a radius of the front end of the fiber optic cable crimp band.

11. The connectorized fiber optic cable assembly of claim 1, further comprising a connection portion attached to the rear end of the fiber optic cable crimp band, wherein the front end of the cable strain relief boot is integrally connected to the fiber optic cable crimp band by interfacing with the connection portion.

12. The connectorized fiber optic cable assembly of claim 11, wherein the connection portion is formed from a different material than the fiber optic cable crimp band.

13. The connectorized fiber optic cable assembly of claim 1, wherein an end portion of at least one internal strength member of the fiber optic cable is compressed between a front portion of the interior surface of the fiber optic cable crimp band and a first end portion of the fiber optic connector sub-assembly for securing the fiber optic cable to the fiber optic connector sub-assembly.

14. The connectorized fiber optic cable assembly of claim 13, wherein the outer jacket of the fiber optic cable is compressed between an inner surface of the gasket portion and a second end portion of the fiber optic connector sub-assembly for securing the fiber optic cable to the fiber optic connector sub-assembly.

15. A method of assembling a terminated fiber optic connector assembly, comprising:
- providing a fiber optic connector sub-assembly having a front end and a rear end;
- providing a fiber optic cable crimp assembly comprising:
  - a cable strain relief boot having a front end and a rear end, wherein the cable strain relief boot also includes an integral gasket portion extending into the rear end of the fiber optic cable crimp band along an interior surface of the fiber optic cable crimp band; and
  - a fiber optic cable crimp band having a front end and a rear end, the rear end of the fiber optic cable crimp band integrally connected to the front end of the cable strain relief boot;
- inserting an end portion of a fiber optic cable through the rear end of the cable strain relief boot such that the cable strain relief boot provides bend and strain relief for the end portion of the fiber optic cable; and
- crimping the fiber optic cable crimp band about the end portion of the fiber optic cable and about the fiber optic connector sub-assembly such that the end portion of the fiber optic cable is secured to the fiber optic connector sub-assembly, wherein the gasket portion of the cable strain relief boot is compressed around an outer jacket of the fiber optic cable for securing the fiber optic cable to the fiber optic connector sub-assembly.

* * * * *